Figure 1:
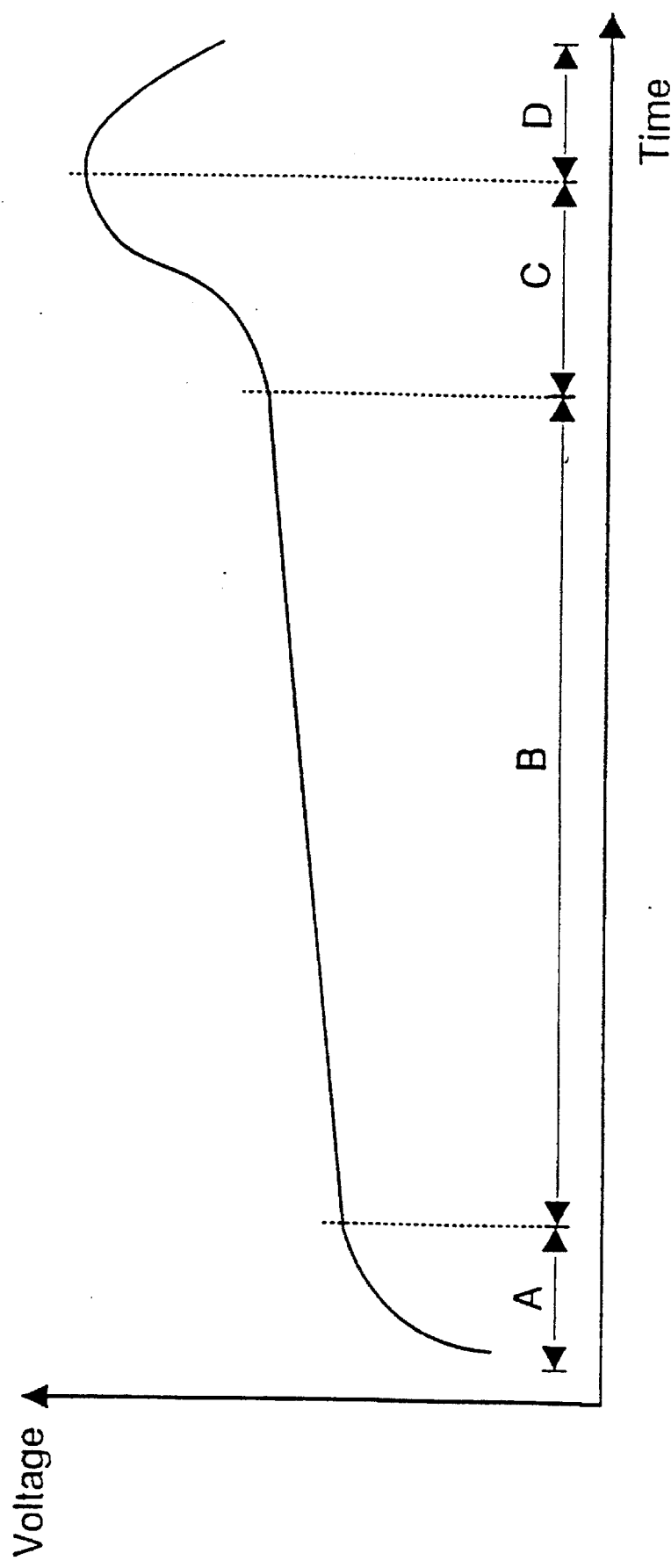

United States Patent [19]

Reipur et al.

[11] Patent Number: 5,619,118
[45] Date of Patent: Apr. 8, 1997

[54] METHOD AND AN APPARATUS FOR CHARGING A RECHARGEABLE BATTERY

[75] Inventors: John Reipur, Klampenborg; Ebbe Juul-Hansen, Stenløse, both of Denmark

[73] Assignee: Chartec Laboratories A/S, Denmark

[21] Appl. No.: 104,123

[22] PCT Filed: Feb. 14, 1992

[86] PCT No.: PCT/DK92/00047

§ 371 Date: Sep. 16, 1993

§ 102(e) Date: Sep. 16, 1993

[87] PCT Pub. No.: WO92/15142

PCT Pub. Date: Sep. 3, 1992

[30] Foreign Application Priority Data

Feb. 14, 1991 [DK] Denmark .................................. 253/91

[51] Int. Cl.⁶ .................................................. H01M 10/44
[52] U.S. Cl. .................... 320/31; 320/22; 320/2
[58] Field of Search ............................ 320/30, 31, 32, 320/22, 25, 2

[56] References Cited

U.S. PATENT DOCUMENTS

| | | | |
|---|---|---|---|
| 4,031,450 | 6/1977 | Hammel et al. | 320/23 |
| 4,052,656 | 10/1977 | Lavell et al. | 320/23 |
| 4,371,826 | 2/1983 | Shelly | 320/21 |
| 4,388,582 | 6/1983 | Saar et al. | 320/20 |
| 4,392,101 | 7/1983 | Saar et al. | 320/20 |
| 4,468,605 | 8/1984 | Fitzgerald et al. | 320/36 |
| 4,503,378 | 3/1985 | Jones et al. | 320/20 |
| 4,639,655 | 1/1987 | Westhaver et al. | 320/14 |
| 4,667,143 | 5/1987 | Cooper et al. | 320/22 |
| 4,670,703 | 6/1987 | Williams | 320/22 |
| 4,710,694 | 12/1987 | Sutphin et al. | 320/21 |
| 4,746,852 | 5/1988 | Martin | 320/20 |
| 4,746,854 | 5/1988 | Baker et al. | 320/40 |
| 4,775,827 | 10/1988 | Ijntema et al. | 320/44 |
| 4,947,124 | 8/1990 | Hauser | 324/430 |
| 5,013,992 | 5/1991 | Eavenson et al. | 320/31 |
| 5,027,294 | 6/1991 | Fakruddin et al. | 364/550 |
| 5,049,803 | 9/1991 | Palanisamy | 320/20 |
| 5,113,128 | 5/1992 | Ohara et al. | 320/21 |
| 5,121,047 | 6/1992 | Goedken et al. | 320/39 |
| 5,136,231 | 8/1992 | Faulk | 320/31 |
| 5,157,320 | 10/1992 | Kuriloff | 320/39 |
| 5,164,652 | 11/1992 | Johnson et al. | 320/2 |
| 5,179,335 | 1/1993 | Nor | 320/21 |
| 5,198,743 | 3/1993 | McClure et al. | 320/31 |

FOREIGN PATENT DOCUMENTS

| | | | |
|---|---|---|---|
| 0005841 | 12/1979 | European Pat. Off. | H02J 7/10 |
| 0034003 | 8/1981 | European Pat. Off. | H02J 7/04 |
| 0074444 | 3/1983 | European Pat. Off. | H02J 7/00 |
| 0121325 | 10/1984 | European Pat. Off. | H02J 7/04 |
| 0124739 | 11/1984 | European Pat. Off. | H02J 7/04 |
| 0139988 | 5/1985 | European Pat. Off. | H02J 7/04 |

(List continued on next page.)

*Primary Examiner*—Robert Nappi
*Attorney, Agent, or Firm*—Michael A. Lechter; Squire, Sanders & Dempsey

[57] ABSTRACT

A rechargeable battery is charged by connecting the terminals of the battery to an electrical power source. In order to avoid overcharging and undue temperature increase in the battery cell, the course of a least one charging parameter, such as the increase rate of voltage, is surveyed during at least part of the process of charging the battery. This charging parameter surveyed is compared with a number of reference parameter courses representing idealistic or desireable processes of charging the battery for different starting states of charge of the battery. Such comparisons may for example be made by means of a microprocessor, which may also select the reference course with a starting state of charge similar to the actual starting state of charge of the battery. Thereafter the process of charging the battery may be controlled so as to approximate the course of said charging parameter to the selected reference course. The charging voltage may be limited to a maximum value (Vmax). When such value has been reached the charging process may be terminated after a certain predetermined time period being one of the reference values.

52 Claims, 6 Drawing Sheets

FOREIGN PATENT DOCUMENTS

| | | | |
|---|---|---|---|
| 0181112 | 5/1986 | European Pat. Off. | H02J 7/10 |
| 0293664 | 12/1988 | European Pat. Off. | H02J 7/10 |
| 0361859 | 4/1990 | European Pat. Off. | H02J 7/10 |
| 0399821 | 11/1990 | European Pat. Off. | H02J 7/10 |
| 0432690 | 6/1991 | European Pat. Off. | H02J 7/10 |
| 3308515 | 9/1983 | Germany | H02J 7/04 |
| 90 10 972.4 | 8/1990 | Germany | H02H 7/18 |
| 2219151 | 11/1989 | United Kingdom | H02J 7/00 |
| 2237696 | 5/1991 | United Kingdom | H02J 7/04 |
| 2259615 | 3/1993 | United Kingdom | H02J 7/04 |
| WO86/00418 | 1/1986 | WIPO | G01B 31/36 |
| WO89/08940 | 9/1989 | WIPO | H02J 7/10 |
| WO90/03682 | 4/1990 | WIPO | H02J 7/00 |
| WO91/19343 | 12/1991 | WIPO | H02J 7/04 |

METHOD AND AN APPARATUS FOR CHARGING A RECHARGEABLE BATTERY

The invention concerns a method of charging a rechargeable battery, wherein an electrical source of energy is connected to the battery. One or more characteristic parameters of the charging process are currently measured and optionally calculated during charging, and these are compared with reference values. The invention also concerns an apparatus for performing the method.

When charging a rechargeable battery, such as for example an NiCd battery, an electrical voltage greater than the terminal voltage of the battery is applied to the terminals of the battery, whereby a current will run through the battery. This current initiates a chemical process by which energy is stored in the battery.

When the battery has reached a full charge condition, the chemical process stops, and the added energy will instead be converted into heat. Since the battery is constructed as a sealed container, the pressure in the battery increases, which causes chemical destruction. This means that the capacity of the battery is reduced, and the capacity may eventually have been reduced significantly after several such chargings. For the battery to be utilized in the best possible manner it is therefore important partly that the battery will be charged fully partly that charging is interrupted before the generation of heat becomes too great. The problem is thus to interrupt charging as precisely as possible at the proper time.

Frequently, the charging period for a battery is desired to be as brief as possible, which has led to the use of greater and greater charging currents, and since this accelerates the heat generating process additionally, it is even more important to interrupt charging at the proper time.

In a typical charging sequence the voltage across the battery increases evenly as the battery is charged. As the battery approaches its full state of charge, the voltage increases more steeply to a peak marking the full state of charge. The voltage then drops again owing to the increase in temperature because the temperature coefficient of the voltage is negative. Correspondingly, the charging current typically falls to a minimum at full charge and then increases.

The art includes some methods which attempt to ensure optimum charging by cutting off charging at the proper time. However, they have been found to be lacking in precision. If charging is interrupted too late, the result will be heat generation and mechanical destruction, as mentioned, and if charging is cut-off too early, the battery will be undercharged.

One of the known methods comprises measuring the temperature of the battery and then cutting-off charging when an increase in temperature is observed. However, it is frequently too late when the increase in temperature is so great that it can be measured, and it is moreover difficult to measure the temperature sufficiently accurately, one reason being the possible variations in ambient temperature. This will, for example, be the case if a battery from an automobile telephone is moved in winter from a cold car to a charger which is present at room temperature.

Another know method comprises measuring the voltage across the battery and cutting off charging when the voltage assumes a determined level. However, this voltage often varies somewhat from battery to battery, even in case of batteries of the same type, and it is moreover temperature dependent so that it is very difficult to determine the voltage at which charging is to be cut-off.

Similarly, it is possible to measure the charging current, and the same observations apply here as well.

Many known chargers rely on fixed periods of time so that charging is simply cut-off after the elapse of this time. This, however, is a very inexpedient method because it is not known in advance whether the battery is completely or only partially discharged, and the necessary charging time depends strongly upon this. This might be solved by discharging the battery fully prior to charging; but in addition to the waste of energy involved, it takes a certain time, and there will still be a good deal of difference between the necessary charging time from battery to battery.

A more advanced method is to measure the voltage change (or current change) as a function of time, i.e. the slope of a curve showing the voltage as a function of time. For example, U.S. Pat. No. 4,052,656 discloses a method which finds the point at which the slope is zero, corresponding to the peak where the battery is fully charged; however, it is difficult to determine the point accurately since the curve may be very flat here, and another drawback is that there may be other points on the curve where the slope is zero so that charging is cut-off too early.

In U.S. Pat. No. 4,747,854 it is detected correspondingly when the voltage curve assumes a negative slope exceeding a reference value. The observations just made also apply here; however, already at this time the battery may have been overcharged to a certain degree, which can damage the battery.

Also U.S. Pat. No. 4,388,582 measures the slope of the voltage curve to find the point where the slope of the curve changes from increase to decrease. This is a more reliable method since the battery will rarely be overcharged; on the other hand, however, the location of the point in question may vary greatly, and charging will typically be terminated much too early so that the battery will only be charged to part of its full capacity. Further, it involves a risk of wrong measurements if, for example, the charging current or the voltage supply is changed during charging.

It is also known to use a combination of some of the above-mentioned methods. Thus, for example, U.S. Pat. No. 4,639,655 relies on four stop criteria, viz. a voltage limit, a predetermined time limit, a calculated increase on the voltage curve as well as the point where the slope of the voltage curve is zero. Charging is interrupted if just one of these criteria is satisfied. The mentioned time limit is selected after charging has been started, an initial voltage measurement being made, and on the basis of this a short or a long charge time is selected, for example 1 hour or 1.75 hours. The advantage is that some regard can be had to the battery discharge state from the beginning as well as to the number of cells in the battery; but it is still a rather imprecise method which involves a risk of battery overcharging.

The invention provides a method where charging of the battery can be terminated at the optimum time where the battery has been fully charged without any risk of overcharging and thereby mechanically destroying the battery.

This is achieved according to the invention in that in response to comparison between the measured or calculated parameters and known reference values it is possible at any time to determine a remaining charge time and thereby a possible stop point of time for the charging process following which charging can be cut-off in response to these stop points of time.

Characteristic parameters include, for example, the voltage across the battery or the charging current. Experience shows that with respect to curves showing these parameters as a function of time, there is great correlation between the momentary appearance of the curves and the distance to the point of time where it is optimum to terminate charging.

Having measured the momentary appearance of the curve, it can thus be determined relatively easily by comparison with the reference values how long the battery is still to be charged.

Typically, charging will be terminated when the first of the generated stop points of time occurs; however, also more sophisticated solutions are conceivable, for example where more importance is attached to the stop points of time last calculated. Thus, a stop point of time may optionally be ignored if later calculations show that it was wrong.

It is particularly expedient to find the rate of change in the parameters as a function of time, corresponding to the slope of the mentioned curves, and this may be done by storing the measurement values so that at a given time the actual value may be compared with a previous measurement value, whereby the rate of change may be calculated.

In a particular embodiment there is just a limited number of reference values, and a new stop point of time for the charging process is determined only when the parameter or parameters concerned assume one of the reference values. This results in a simpler procedure which can nevertheless normally determine the optimum stop point of time sufficiently accurately.

When the parameter being measured is the voltage across the connection terminals of the battery, a more exact measurement is obtained if the charging current to the battery is cut-off for a short period before the voltage is measured. The reason is that the battery has an internal series resistance, and the charging current provides a voltage drop across this resistance which should not be included in the voltage measurement.

In particular in case of fast charge mode using a high charging current it may be advantageous to reduce the charging current gradually as the stop point of time approaches, because it will then be easier to find the optimum stop point of time. Thus, charging may, for example, be performed with a constant high charging current until one of the measured parameters has reached a determined level, following which the current can be reduced gradually.

An expedient manner of obtaining the desired charging current is to use a constant voltage source which is pulse width modulated in a manner providing the desired charging current.

It may often be an advantage that the procedure of determining the possible stop point of time for the charging process is not initiated until the charging process approaches its termination. Thus, a simpler method may be used, such as simple measurement of current or voltage, for deciding when the more accurate procedure is to be initiated.

In a particular embodiment the accuracy of the measurements is improved in that the measurement values of the characteristic parameters for each of the mentioned points of time are an average of a plurality of intermediate measurements. The advantage is that the measurements will be less sensitive to transients, for example. Of course, the same effect can be obtained by integrating the parameter in question over the period which has elapsed since the last measurement.

It may be an advantage to adopt some of the stop criteria which are used in the prior art as an additional safeguard. Thus, for example, a maximum charge period may be fixed. Charging will then be interrupted at this point of time at the latest even though the other stop criteria have not yet occurred. It is also possible to fix limits for one or more of the measured parameters so that charging is terminated if one of the parameters exceeds or falls below specific values.

After the termination of charging it may be expedient to maintain the charge state of the battery by means of a pulsating current. This ensures that the battery is constantly fully charged even if it is not removed from the charger till long after the termination of the charging.

It may likewise be expedient to apply a voltage to the battery briefly before the actual charging is initiated. By thus measuring the characteristic parameters it may be decided whether a battery of correct type and without errors is fitted in the charger. If this is not the case no charging takes place. Thus, this obviates charging wrong battery types or defective batteries where, for example, a cell is turned wrongly.

An apparatus for charging a rechargeable battery according to the described method may comprise an electrical source of energy, a measurement device capable of measuring one or more of the said characteristic parameters and supplying the measurement results via an analog/digital converter to a control unit capable of calculating other characteristic parameters and controlling the source of energy, as well as a storage circuit for storing measurement values, calculated values and reference values. Further, during charging the apparatus can compare the characteristic parameters with reference values by means of the control unit.

The desired effect is obtained in that in response to said comparison the apparatus determines a possible charging process stop point of time for each or some of the said points of time, and that it can terminate charging in response to the stop points of time thus produced.

A particularly expedient embodiment of the apparatus is adapted to compare actual measurement values for the characteristic parameters with previous measurement values of the same parameters for each of the said points of time to thereby determine the rate of change in the parameters as a function of time, corresponding to the slope on the curve showing the parameter concerned as a function of time. The said stop points of time are determined by comparing the rate of change with reference values.

If the apparatus measures the voltage across the connection terminals of the battery, it will be an advantage that the apparatus can cut-off the charging current to the battery for a short period before the voltage is measured, it being thereby possible to disregard the voltage drop occurring across the internal resistance of the battery.

The apparatus can advantageously be constructed such that the charging current to the battery can be controlled by pulse width modulating a constant voltage, the pulse width being controlled by the control unit of the apparatus in response to the measurement results received.

As an additional safeguard the apparatus may be adapted to cut-off charging if other and more simple stop criteria occur. Charging may, for example, be cut-off if a determined maximum charge period is exceeded, or if one of the measured parameters exceeds or falls below some predetermined values.

In a expedient embodiment the apparatus is moreover adapted to maintain the charge state of the battery after the termination of charging by means of a pulsating current. It is ensured hereby that the battery is still fully charged even though it is not removed from the apparatus till long after the termination of the charging proper.

An additional embodiment is adapted to briefly apply a voltage to the battery prior to the commencement of the charging process and to measure the characteristic parameters. The charging process will then be initiated only if these measurements satisfy certain conditions. It is ensured hereby that charging will not be performed on wrong or defective batteries.

According to another aspect the present invention provides a method of charging a rechargeable battery having a pair of terminals, said method comprising connecting an electrical power source to the terminals of the battery, surveying the course of at least one charging parameter during at least part of the process of charging the battery, comparing the course of said at least one charging parameter with a number of reference parameter courses representing idealistic or desireable processes of charging the battery for different starting states of charge of the battery, selecting the reference course with a starting state of charge similar to the actual starting state of charge of the battery, and controlling the process of charging the battery so as to approximate the course of said at least one parameter to the selected reference course.

A smaller or greater number of empirically determined reference parameter courses may be stored (such as drafts where values of the reference parameter is plotted versus the period of time lapsed since starting of the charging process), for example by electronic storing means, such as a memory. When it is desired to rapidly charge the rechargeable battery without substantially deteriorating the same the idealistic or desirable process of charging mainly depends on the state of charge of the battery prior to starting the charging process. Therefore, the reference parameter courses stored represent idealistic or desireable processes of charging for different starting states of charge of the battery. If the state of charge of the battery to be recharged is known or may be determined, the reference course with the starting state of charge closest to the actual state of charge of the battery to be recharged may be selected, and the process of charging the battery may be controlled so as to approximate the course of said at least one parameter to the selected reference course, whereby it may be secured that the battery is not at any time exposed to unduly high voltage or charging current or to undue heating.

In principle, the state of charge of the battery to be recharged may be determined by a special measuring step, and the corresponding reference parameter course adapted to the same or a similar starting state of charge may then be selected, for example by providing the relevant information to an electronic control unit by suitable keys. In the preferred embodiment, however, the relevant reference course is selected automatically by an electronic control circuit.

The charging parameter may, for example, comprise the potential across the battery terminals, the electric charging current supplied to the battery, the temperature of the battery cell, the rate of change of any such parameter, and any combination of such parameters and/or rate of change.

It should be understood that the charging process may be controlled in any suitable manner by which the course of the charging parameter may be approximated to the selected reference parameter course. In the preferred embodiment, however, the process of charging is controlled by controlling the voltage supplied to the terminals of the battery. The voltage is preferably controlled so that the charging current supplied to the battery is relatively low at the beginning of the charging process, while the charging current is preferably maintained at substantially the same maximum value during a subsequent major part of the charging process, so as to accelerate the same.

Towards the end of the charging process the internal resistance of the battery cell may increase, whereby the charging voltage tends to increase when the charging current is to be maintained at said maximum value. A too high voltage may course a detrimental temperature increase within the battery cells. Therefore, the voltage supplied to the terminals of the battery is preferably limited to a predetermined maximum, the charging process being terminated at the expiration of a predetermined period of time starting when the voltage has reached said maximum. This means that the charging voltage is preferably kept at its maximum value during said predetermined period of time, and as the inner resistance of the battery cells is increasing the charging current will normally decrease gradually during this period of time, which is preferably selected so that the battery is substantially fully charged when the said period of time has expired. Preferably, the predetermined period of time is related to the reference course selected, which means that each reference parameter course includes information about not only the maximum charging voltage to be supplied to the battery, but also about the period of time in which such maximum voltage should be maintained at the end of the charging period.

As mentioned above, the reference parameter courses to be compared with the actual parameter course may be curves or graphs, and the comparison process may be performed by a design recognition technique by means of design recognition circuitry. In the presently preferred embodiment, however, the charging parameter is currently measured at short time intervals during charging, the measured parameter values being compared with corresponding reference values of the reference parameter courses, and the relevant reference parameter course being selected on the basis of comparison of such measured values and reference values. The comparison process may be performed currently during the charging process so that the control circuit or control unit may shift from one reference parameter course to another when the continued comparison process reveals that the reference parameter course chosen first is not the one which is closest to the actual charging process.

In comparing the charging parameter values with the reference values it may be advantageous to compare the rate of change of the parameter values as a function of the charging time lapsed with similar reference values. As an example, the rate of change of the charging voltage as a function of the charging time lapsed may be compared with the corresponding reference values. In order to permit the detection of the internal resistance free voltage of the battery the charging current may be cut off for a short period of time immediately prior to each measurement of the potential difference of the battery terminals.

The parameter values may be measured and the rate of change of the parameter values may be determined at uniform first time intervals, each determination of the rate of change being based on parameter values measured at second time intervals, the second time interval being a multiple of the first time interval. The parameter values may be measured rather frequently, which means that the said first time interval may be relatively short, for example about 10 seconds. The rate of change is, however, preferably based on measurements with a time spacing being several times greater, for example 90 seconds.

The determination of the rate of change may be initiated at the beginning of the charging process. However, the determination of the rate of change may advantageously be postponed until a measured value of the characteristic parameters exceed a predetermined value, when it is obvious that the best distinguishable rates of change are found after such predetermined value of the parameter.

The reference parameter courses stored may comprise not only courses representing charging processes which are idealistic or desirable for one and the same type of battery, but even a plurality of reference parameter courses for each of two or more different types of battery. In such case the first process step may be to determine the type of the battery to be charged and to select the reference parameter courses related to that type of battery. Thereafter, the process may proceed as described above.

The present invention also provides an apparatus for charging a rechargeable battery, said apparatus comprising connecting means for connecting the battery to an electrical power source, means for surveying the course of at least one charging parameter during at least part of the process of charging the battery, storing means for storing a plurality of reference parameter courses representing idealistic or desirable processes of charging the battery for different starting states of charge of the battery, means for comparing the course of said at least one charging parameter with the reference parameter courses stored by the storing means and for selecting the reference course with a starting state of charge similar to the starting state of charge of the battery, and means for controlling the process of charging the battery so as to approximate the course of said at least one parameter to the selected parameter course.

The operation of such an apparatus may, for example, be controlled by a microprocessor or another electronic control circuit, which may also comprise a memory for storing the reference parameter courses.

Figure 2:
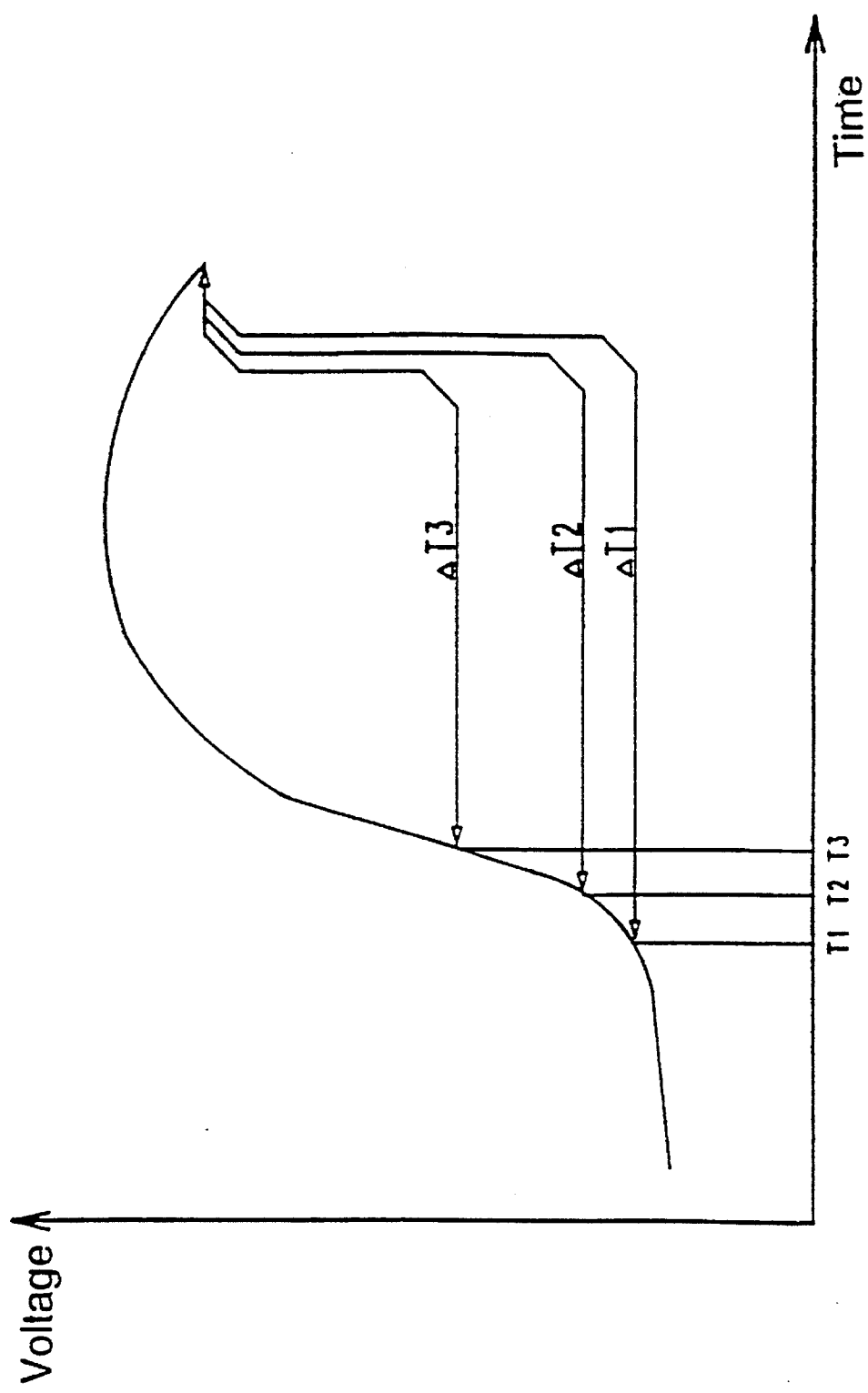
Figure 3:
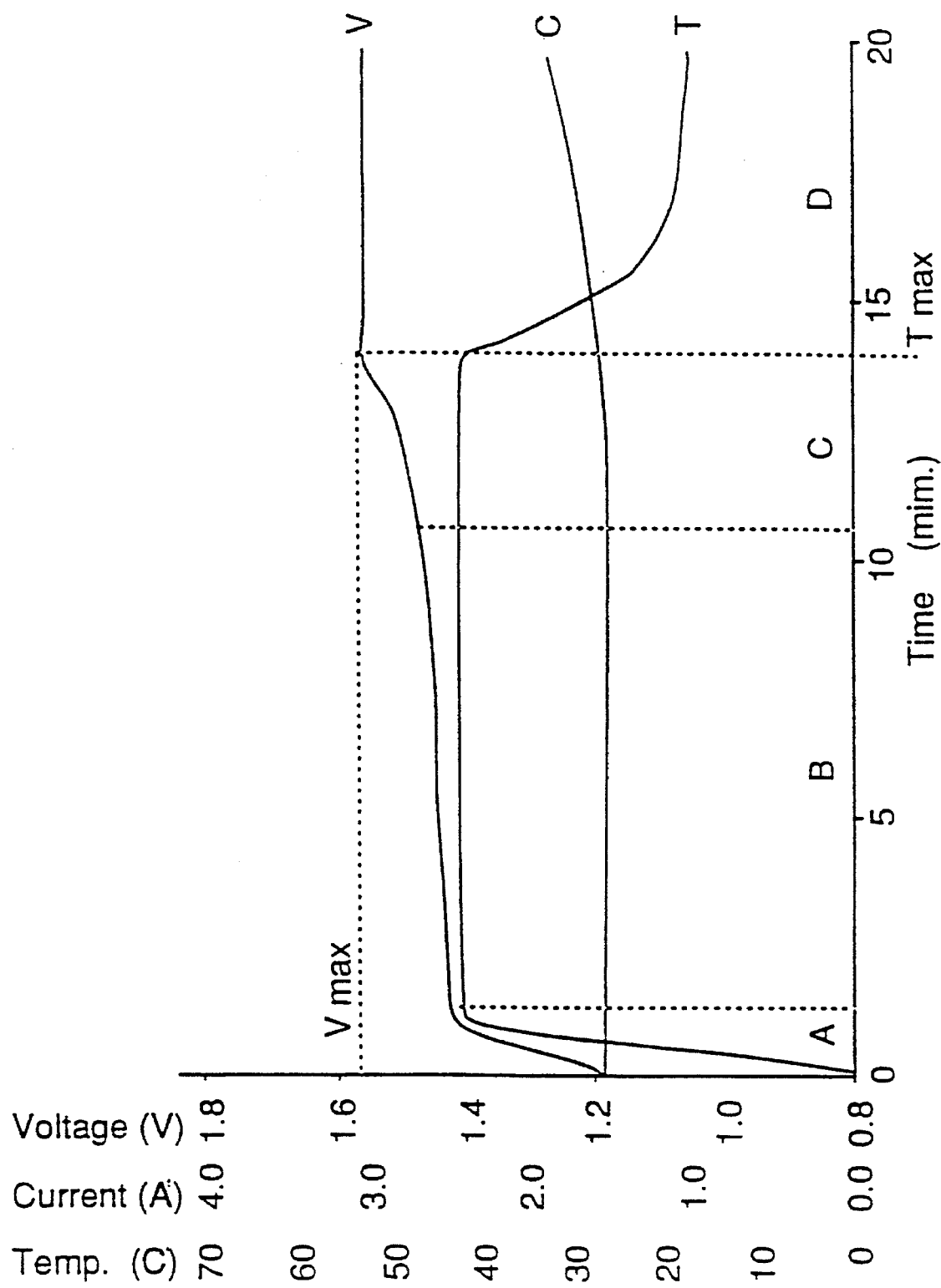
Figure 4:
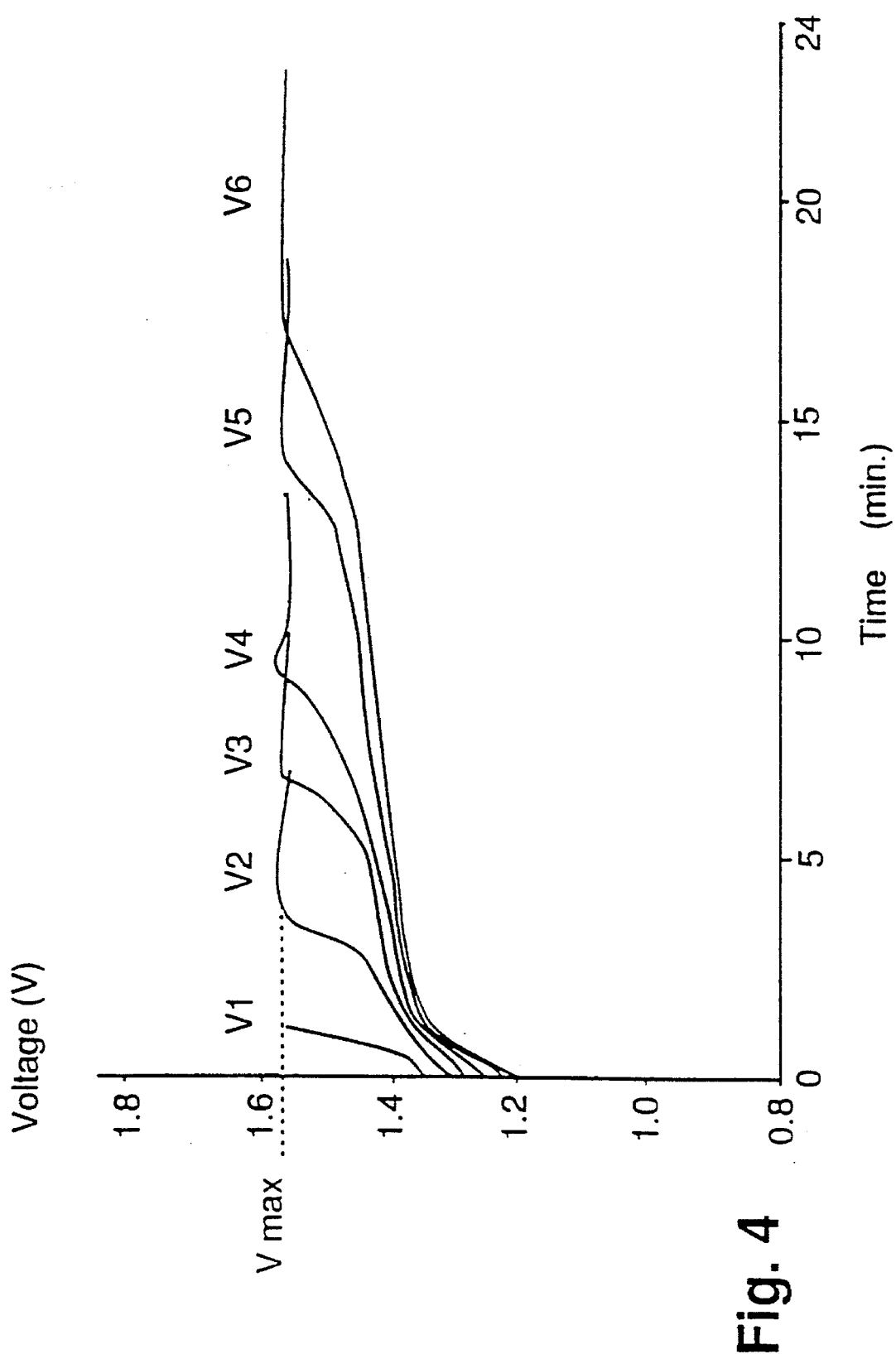
Figure 5:
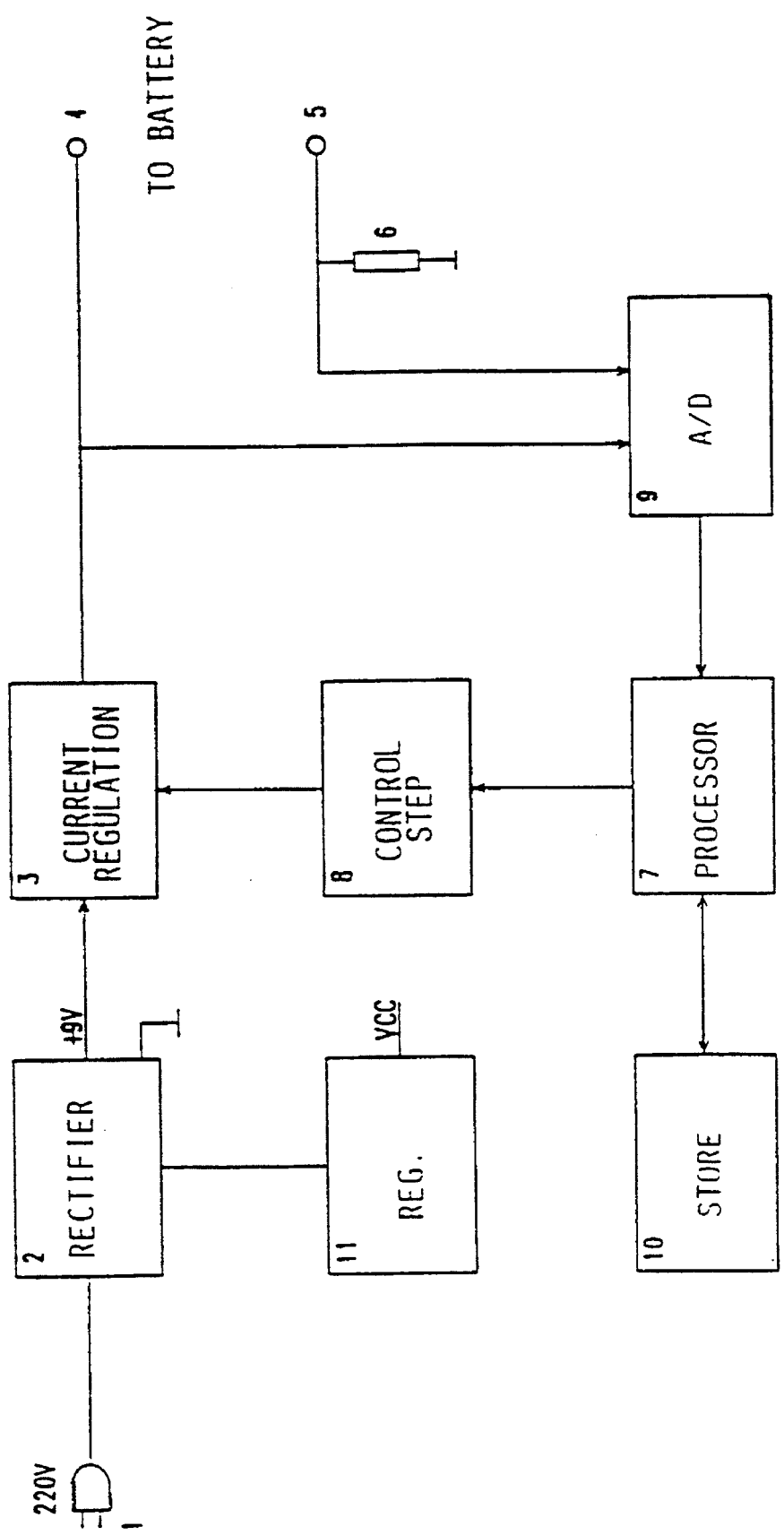
Figure 6:
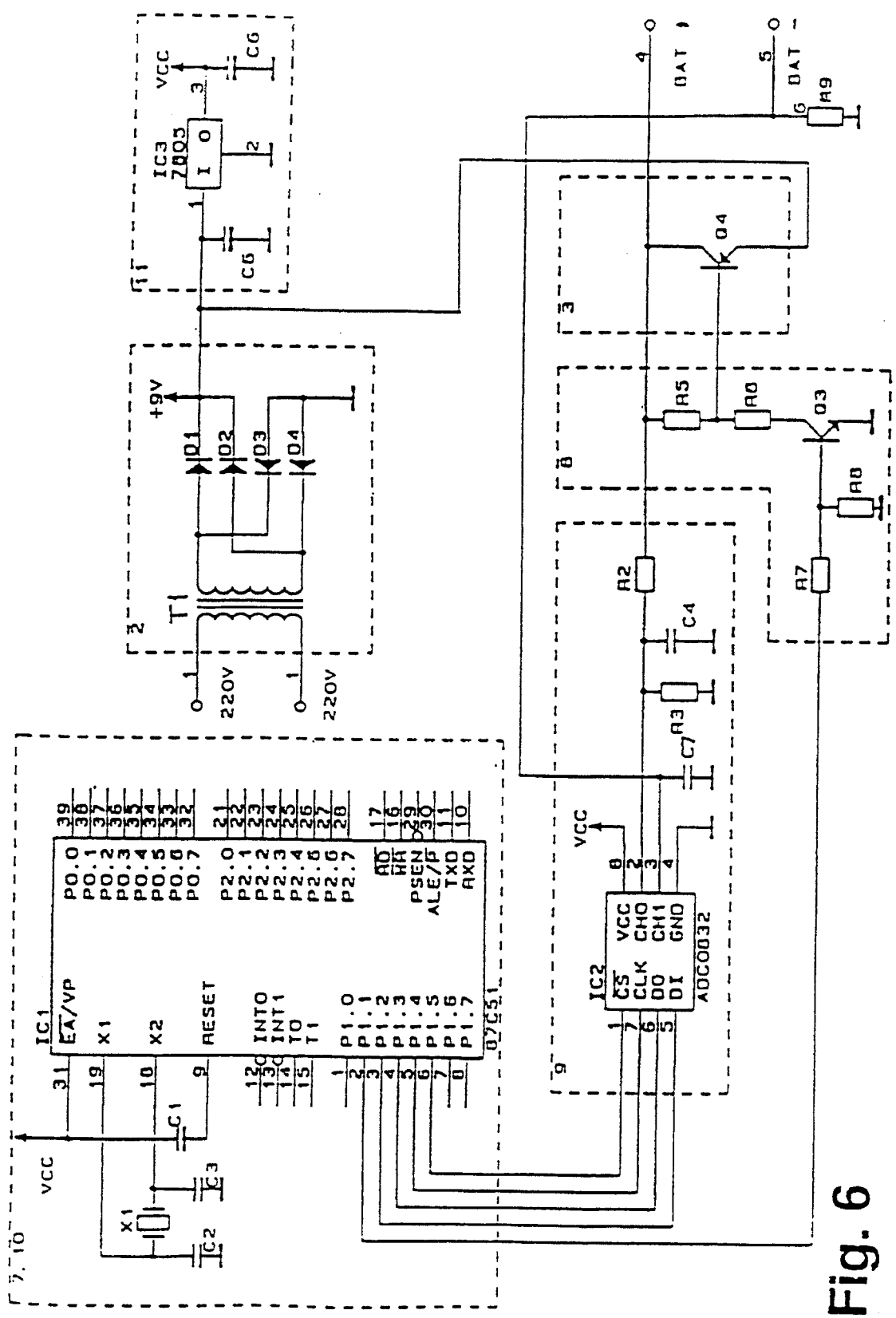

The invention will now be further described with reference to the drawing, in which FIG. 1 is a curve showing the voltage as a function of time for an NiCd battery which is charged with a constant current, FIG. 2 shows a section of the curve from FIG. 1, FIG. 3 shows the curves of a regulated charging course for an NiCd battery, FIG. 4 shows the battery voltage of an NiCd battery as a function of time for six different starting states of charge, FIG. 5 is a block diagram of an apparatus according to the invention, and FIG. 6 shows a circuit diagram of an embodiment of the apparatus from FIG. 5.

FIG. 1 shows a typical charging sequence for an NiCd battery. The curve shows the battery voltage as a function of time with a constant charging current. The curve shape will be the same for all NiCd batteries but the specific voltage and time values may vary, for example with the actual charging current and from battery to battery. The curve may be divided into regions representing various stages in the charging process. The figure shows four regions which are marked A, B, C, and D, respectively.

The region marked A constitutes the start of the charging process. When the charging process is initiated, the voltage may vary somewhat depending upon the state of charge of the battery prior to the initiation of charging. Since the voltage in this region is thus rather indefinite, no measurements proper are usually performed in this region.

The letter B indicates the actual charging period where the charging current is converted into stored energy in the battery by the chemical process mentioned before. In this period the voltage of the battery increases only slowly. In the region C the battery now approaches its full state of charge, and the voltage begins to increase more rapidly. Oxygen begins to develop at the end of the period C, which results in a pressure increase and thereby a temperature increase in the battery. This means that the voltage now increases more slowly again because of its negative temperature coefficient. The battery voltage does not increase additionally at the transition between the regions C and D, and it has thus reached its highest value.

If the charging process is continued in the region D, the battery voltage now drops because the electrical energy is now generally just converted to heat. The resulting increase in temperature and pressure will cause mechanical destruction in the battery whose capacity is thus reduced. The charging process should therefore be cut-off at the commencement of or in the beginning of the period D.

The invention is based on the fact that it has been found by tests that, even though the curve may vary somewhat in response to the charging current used and the history of the battery in question, there is close correlation between various charging parameter values within the regions A, B and C, such as the slope of the curve at a given moment in the region C and the distance in time from the moment in question to the optimum stop point of time for the charging process.

If the information on the correlation is stored in an electronic circuit, an example of which will be given below, it is thus relatively simple to calculate or determine how long charging should be continued on the battery and thereby the optimum stop point of time for the charging process, after having measured the slope of the curve at a given moment. If this calculation is performed at several consecutive moments, a corresponding number of proposals for the optimum stop point of time will thus be obtained. FIG. 2 shows an example where three measurements are performed. A remaining charging period of delta T1 is calculated at the point of time T1, a remaining charging period delta T2 is calculated at the point of time T2 and a remaining charging period delta T3 is calculated at the point of time T3. In the figure, the three calculated stop points of time occur at precisely the same moment. However, in practice the calculated stop points of time will usually be slightly different, with a consequent number of proposals for stop points of time. In the embodiment of the invention described here, it is decided to cut-off the charging process when the first one of the calculated stop points of time occurs. Since a microprocessor is incorporated in the apparatus described below, more sophisticated stop criteria are also conceivable. Thus, it will be possible, for example, to attach more importance to the stop points of time last calculated. It is thus possible, for example, to disregard some of the values calculated first if all the subsequent calculations gather around a specific value.

As mentioned, FIGS. 1 and 2 show the voltage across the battery as a function of time when a constant charging current is used. A corresponding typical curve will result if the charging current is plotted as a function of time with a constant charging voltage, and reproducible curves showing the above-mentioned stages in the charging process will be obtained even if neither charging current nor charging voltage is kept constant. It will be appreciated that these curves can be used in a manner similar to what is described above.

Corresponding curves of a different appearance will be obtained for other battery types. For some of them the correlation between the actual measurement point of time and the optimum remaining charging time will not necessarily be associated with the slope of the curve at the moment in question, but with other parameters for the curve, such as, for example, the absolute voltage at the moment concerned.

An embodiment of the invention comprises measuring the slope of the voltage curve currently, for example every tenth second. For each measurement a remaining charging period and thereby a new proposal for a stop point of time are calculated. The processor can then either store this value together with the others, or it can incorporate it in a more sophisticated calculation of when the charging process is to be terminated.

Another embodiment comprises prestoring a limited number of reference values for the slope of the curve. In each measurement the actual slope of the curve is compared with the reference values, and only when the slope passes one of the reference values does the processor calculate a new stop point of time. Calculating time for the processor is saved in this manner, and the result will be fully satisfactory in many situations.

As mentioned, the curves in FIGS. 1 and 2 are provided with a constant charging current. However, an alternative possibility is to cut-off the charging current briefly each time a voltage measurement is performed. A quite corresponding curve is obtained in this manner, but the absolute voltage values will be slightly lower because the curve does not include the voltage drop involved by the charging current across the internal resistance of the battery.

Since this internal resistance typically increases at the end of the charging sequence, a voltage measurement without this contribution will be a more accurate measure of the state of the battery.

As mentioned before, reproducible curves will be obtained even if the charging current is not kept constant during the entire charging procedure. The principle of the invention can therefore very well be combined with a charging procedure where charging is initially performed with a constant, high current which is then reduced toward the end of the charging procedure. By using the lower charging current during the last portion of the charging process it will be possible to determine the optimum stop point of time more precisely, without the overall charging time being diminished noticeably. This may be combined with the performance of just a simple voltage measurement during the first portion of the charging process. When the voltage has reached a predetermined value, the charging current may be reduced, and the measurement of the slope of the curve may be initiated as described above. Of course, it is also possible to reduce the charging current at one voltage value and initiating the measurement of the slope of the curve at another voltage value.

FIG. 3 shows typical charging curves obtained in accordance with an embodiment of the method according to the invention when charging a NiCd battery. The curve V shows the battery voltage as a function of time, when the voltage supplied to the battery is controlled in accordance with the invention in order to obtain an optimum charging current curve C and an optimum battery temperature curve T. The battery voltage curve V may be divided into regions representing various stages of the charging process similar to FIG. 1. FIG. 3 shows four regions which are marked A, B, C and D, respectively.

The region marked A constitutes the start of the charging process. Here, the voltage supplied is controlled so that the charging current supplied to the battery is relatively low.

The B region indicates the actual charging period where the charging current is converted to stored energy in the battery. Here, the voltage supplied is controlled so that the charging current i maintained at substantially the same maximum value, which is determined by the type of battery involved, and the voltage across the battery increases only slowly.

In the C region the battery now approaches its state of full charge and in order to maintain the maximum charging current, the voltage across the battery begins to increase more rapidly until the voltage across the battery terminals reaches the predetermined maximum Vmax (which is given by the type of battery involved).

In the D region the voltage supplied is controlled so that the measured voltage across the battery terminals is equal to the maximum limit, Vmax. In the regions C and D the internal resistance of the battery cell is increased, and for a constant battery voltage, as in the D region, the resulting charging current will decrease. Due to the fact that the battery voltage is kept at a constant value in the region D, the resulting temperature increase is relatively low, keeping the destructive effect caused by the charging current on the battery cells at a minimum.

Not later than the time Tmax when Vmax is reached, the remaining charging period is determined. When such remaining charging period starting at Tmax has lapsed, the charging process is being terminated.

The charging current fed to the battery is controlled by pulse width modulating a constant voltage source.

The voltage curve V shown in FIG. 3 represents a process of charging a NiCd battery which is nearly unloaded. FIG. 4 shows six similar voltage curves V1–V6 representing different charging courses for the same battery with different starting charges. The curve V1 represents the charging process of the battery when nearly fully charged, and the curve V6 represents a charging process of the battery when almost fully discharged. FIG. 4 shows the charging period necessary for obtaining the maximum voltage Vmax increases when the starting state of charge of the battery decreases. It can also be seen from FIG. 4 that the "remaining charging time", which is the time period from the reach of Vmax till the charging process is terminated, increases when the starting state of charge of the battery decreases.

Information about ideal or desired reference voltage curves for the type of battery in question for a plurality of different starting charge conditions of the battery may be stored in an electronic memory. By comparing the course of the actual voltage curve, such as the slope of the curve with the stored reference values, the relevant reference voltage curve and the "remaining charging time" associated therewith may be determined.

The slope of the voltage curve may be measured currently, for example every tenth second during the charge process. For each measurement a comparison is made with the stored reference slopes, and a new proposal for a "remaining charging time" is determined. When the measured battery voltage reaches the stored maximum voltage Vmax, determination of the "remaining charging time" is cancelled, and the last determined "remaining charging time" value is used.

Another embodiment of method according to the invention, which also results in charging curves of the type shown in FIGS. 3 and 4, comprises prestoring a limited number of reference values for the slope of the voltage curve. In each measurement the actual slope of the curve is compared with the reference values, and only when the slope passes one of the reference values a new "remaining charging time" value is determined.

Curves corresponding to those shown in FIGS. 3 and 4 will also be obtained for other battery types. These curves might be of different appearance and for some of them the correlation between the time for reaching the voltage Vmax and the optimum remaining charging time will not necessarily be associated with the slope of the voltage curve in question, but with other parameters of the curve, such as, for example, the absolute voltage at the moment concerned. The more parameters measured and stored, the more sophisticated determinations can be made in order to determine the optimum remaining charging time.

a further embodiment of the method according to the invention which resulting in charging curves of the type shown in FIGS. 3 and 4, comprises measuring the battery voltage at a fixed time together with measuring the slope of the voltage curve when the maximum voltage Vmax is reached. In this embodiment, the voltage together with the slope of the voltage curve can be incorporated in a more sophisticated determination of the optimum remaining charging time.

The voltage curves shown in FIGS. 3 and 4 have been plotted by measuring the voltage across the battery terminals when the battery is being charged. However, an alternative possibility is to cut-off the charging current briefly each time a voltage measurement is performed. A quite similar curve is obtained in this manner, but the absolute voltage values will be slightly lower because the curve does not include the voltage drop involved by the charging current across the internal resistance of the battery. Since this internal resistance typically increases at the end of the charging sequence, a voltage measurement without this contribution will be a more accurate measure of the state of the battery.

In the embodiments described above the measurement of the slope of the curve takes place in the following manner. At each measurement point of time, i.e. for example every tenth second, the voltage of the battery is measured, and the an electronic processor may store this voltage value in a storage circuit. The processor then calculates the difference between this value just measured and, for example, the value which has been measured 90 seconds ago, and this difference is used as a measure of the slope of the curve at the time in question. In this manner, a new value of the slope which has been measured over a period of for example 90 seconds is obtained every ten seconds.

To prevent the voltage measurements from being affected by transients and the like, the voltage is preferably measured much more frequently, for example 100 times between each of the said measurement points of time. Each of these intermediate measurements is stored by the processor, and at the actual measurement points of time the processor calculates an average of the 100 intermediate measurements which have been performed since the last measurement point of time.

When the charging process has been terminated as described above, maintenance charging of the battery may take place if the battery is left in the charger. This takes place by passing current pulses through the battery at intervals.

These current pulses and the time between them are adapted such that they compensate for the self discharge of the battery which would otherwise take place. The pulses may, for example, have a duration of 15–30 seconds and the distance between them may be a few hours.

FIG. 5 shows a block diagram of an embodiment of an apparatus according to the invention. 220 volts are applied to the apparatus by means of an ordinary plug 1, and the voltage is converted in the rectifier block 2 to a 9 volts direct voltage. 3 shows a current regulator which supplies current to the battery to be charged via the terminals 4, 5. The current from the battery runs via the terminal 5 and the resistor 6 via ground back to the rectifier circuit 2. The current regulator 3 is controlled via a control stage 8 from a processor 7. The processor 7 is capable of measuring current and voltage by means of an analog/digital converter 9. The charging current is measured by measuring the voltage drop across the resistor 6, while the voltage of the battery is obtained as the difference between the voltages measured on terminals 4 and 5, respectively. The processor 7 is moreover connected to a storage circuit 10, which is used i.a. for storing measured current and voltage values as well as the calculated stop points of time. A regulator circuit 11 generates a direct voltage of 5 volts from the voltage of 9 volts from the rectifier circuit 2. The voltage of 5 volts is used for supplying the circuits 7, 9 and 10. The current regulator 3 is controlled by means of pulse width modulation, and the processor 7 regulates the pulse width in a manner such that the desired charging current constantly runs through the battery. The processor measures this, as mentioned, by measuring the voltage drop across the resistor 6. If desired, the processor may perform the voltage measurement across the battery in the intervals between the current pulses. The voltage measurement will thus not be affected by the voltage drop which the charging current causes across the internal resistance of the battery.

FIG. 6 shows a circuit diagram of an embodiment of the apparatus from FIG. 5. The blocks from FIG. 5 are shown in broken lines and with the same reference numerals as in FIG. 5. The rectifier block 2 comprises a transformer T1 as well as a rectifier coupling consisting of the four diodes D1, D2, D3, and D4. The output voltage from this is a direct voltage of 9 volts, which is passed partly to the current regulator 3 and partly to the regulator circuit 11. The current regulator 3 consists of a transistor Q4, and it is controlled via the control stage 8 from the processor IC1. The control stage 8 consists of the resistors R5, R6, R7 and R8 as well as a transistor Q3. When the output terminal P1.1 of the processor has a high output signal, the transistor Q3 will be in conductive state via the voltage divider consisting of R7 and R8. Current will hereby run through the voltage divider R5 and R6, causing Q4 to assume a conductive state whereby current is supplied to the battery. When the output terminal P1.1 of the processor is low, both the transistor Q3 and the transistor Q4 will be in a non-conductive state, and no charging current is fed to the battery.

The analog/digital converter 9 consists of the integrated circuit IC2 as well as the resistors R2 and R3 and the smoothing capacitors C4, C7. The measured voltages which are indicative of the battery voltage and the charging current, respectively, are converted to digital information in the integrated circuit IC2, and this digital information is passed further on to the terminals P1.2 and P1.3 of the processor.

In this embodiment the processor circuit IC1 comprises both the processor 7 and the storage circuit 10. Further, the capacitors C1, C2 and C3 as well as a crystal X1 are connected to the processor. Otherwise, the mode of operation of this processor circuit is generally known.

The regulator circuit 11 consists of the integrated voltage regulator IC3 as well as the capacitors C5 and C6. This circuit applies a direct voltage of 5 volts which is used for supplying the circuits IC1 and IC2 with voltage.

The circuit described is useful no matter whether it is decided to measure the voltage during charging of the battery with a constant current, or to measure the current during charging of the battery with a constant voltage, just as combinations of these two may be employed.

Of course, details in the structure of the circuit may be modified within the scope of the invention. Thus, for example, other processor types than the one shown may be used. It is also possible to use other voltages than those indicated in FIGS. 5 and 6, since this may for example depend upon the number of cells in the battery to be charged.

We claim:

1. A method of charging a rechargeable battery, comprising:

connecting an electrical source of energy to the battery, determining the value of one or more characteristic parameters of the charging process at a plurality of points of time during charging, determining, for each of at least two points of time, the apparent remaining period necessary to fully charge the battery the point in time time and stored reference values corresponding to the determined values;

terminating the charging process at a stop point determined from the apparent remaining time periods.

2. A method according to claim 1, wherein the determining step comprises comparing actual measurement values of the characteristic parameters with previous measurement values of the same parameters for each of the said measurement points of time, whereby the rate of change of the parameters is determined as function of time.

3. A method according to claim 1, further including the step of comparing the determined parameters with stored reference values, and wherein the determining the apparent remaining period is performed when the characteristic parameters assume one of the reference values.

4. A method according to claim 3, wherein the energy source applies a charging current to terminals of the battery, and the method further includes the steps of:

measuring the voltage across the terminals of the battery during charging, and cutting-off the charging current to the battery for a brief period before the voltage of the battery is measured.

5. A method according to claim 4, further comprising the step of controlling the voltage supplied to the battery so that the charging current is kept relatively low at the beginning of the charging process.

6. A method according to claim 3, including the step of:

applying a constant charging current to the battery during a first portion of the charging period, and then gradually reducing the charging current until charging is terminated.

7. A method according to claim 6, characterized by controlling the charging current fed to the battery by pulse width modulating a constant voltage source.

8. A method according to claim 7, characterized by initiating the determination of apparent remaining periods when one of the characteristic parameters assumes a predetermined value.

9. A method according to claim 1, characterized in that the step of determining the value of characteristic parameters comprises determining an average of a plurality of intermediate measurements having been performed since the preceding measurement point of time.

10. A method according to claim 1, including the further step of terminating charging if said stop point has not occurred yet after a predetermined period from the start of the charging process.

11. A method according to claim 1, including the further step of terminating charging if one of the measured parameters assumes one of a plurality of predetermined values.

12. A method according to claim 1, including the further step of maintaining the state of the charge of the battery after the termination of charging by means of a pulsating current.

13. A method according to claim 12, including the further step of briefly applying voltage to the battery prior to the initiation of the charging process so that the characteristic parameters can be measured, the results of these measurements determining whether the charging process is to be initiated.

14. An apparatus for charging a rechargeable battery, said apparatus comprising an electrical source of energy, a measuring device for measuring one or more characteristic parameters of the charging process at a series of points of time during charging, a control unit, receptive of indicia of the measured parameters, for calculating other characteristic parameters in accordance with the measured parameter or parameters, controlling the energy source and for terminating the charging process, the control unit including a storage circuit for storing the measured parameter or parameters values, calculated parameter values and reference values, and being adapted to control the charging process based on the values stored, characterized in that the control unit is adapted to determine, for at least two points of time, an apparent remaining charging period of time necessary to fully charge the battery from the point of time based on the measured characteristic parameter or parameters at that time and stored reference values corresponding to the determined values with the reference values, and terminates the charging process at a stop point determined from the apparent remaining time periods.

15. An apparatus according to claim 14, characterized in that for each of the said measurement points of time, the control unit is adapted to compare actual measurement values for the characteristic parameters with previous measurement values for the same parameters to thereby determine the rate of change of the parameters as a function of time, and to determine said apparent remaining charging time periods in accordance with reference values corresponding to the determined rate of change.

16. An apparatus according to claim 14, wherein the energy source applies a charging current to terminals of the battery, and said measuring device generates indicia of the voltage across the terminals of the battery, characterized in that the control unit cuts-off the charging current to the battery for a brief period before the voltage of the battery is measured.

17. An apparatus according to claim 14, characterized in that the control unit is adapted to control the voltage supplied to the battery so that the charging current is kept relatively low at the beginning of the charging process.

18. An apparatus according to claim 17, characterized in that the charging current fed to the battery is regulated by pulse width modulating a constant voltage.

19. An apparatus according to claim 14, characterized in that the control unit is adapted to terminate charging after a predetermined period after the start of the charging process if the stop point has not occurred beforehand.

20. An apparatus according to claim 14, characterized in that the control unit is adapted to terminate charging if one of the measured parameters assumes one of a plurality of predetermined values.

21. An apparatus according to claim 14, characterized in that the control unit is adapted to maintain the state of charge of the battery after the termination of charging by means of a pulsating current.

22. An apparatus according to claim 14, characterized in that the control unit is adapted to briefly apply a voltage to the battery prior to the initiation of the charging process and responsive to measured characteristic parameters, determine whether the charging process is to be initiated.

23. A method of charging a rechargeable battery having a pair of terminals, said method comprising connecting an electrical power source to the terminals of the battery, monitoring at least one charging parameter during at least part of the process of charging of the battery, comparing a sequence of values of said at least one charging parameter with stored reference parameter sequences representing idealistic or desirable processes of charging the battery for different starting states of charge of the battery, selecting the reference sequence corresponding to the sequence of values of said at least one charging parameter, and controlling the process of charging the battery so as to cause the sequence of subsequent values of said at least one parameter to approximate the selected reference parameter sequence;

wherein the process of charging is controlled by controlling the voltage supplied to the terminals of the battery and the voltage supplied to the battery is controlled so that the charging current is kept relatively low at the beginning of the charging process.

24. A method according to claim 23, wherein the voltage supplied to the terminals of the battery is limited to a predetermined maximum, the charging process being terminated at the expiration of a predetermined period of time starting when said voltage has reached said maximum.

25. The method of claim 24, wherein said predetermined period of time is related to the reference sequence selected.

26. The method of charging a rechargeable battery having a pair of terminals, said method comprising connecting an electrical power source to the terminals of the battery, monitoring at least one charging parameter during at least part of the process of charging of the battery, comparing a sequence of values of said at least one charging parameter with stored reference parameter sequences representing idealistic or desirable processes of charging the battery for different starting states of charge of the battery, selecting the reference sequence corresponding to the sequence of values of said at least one charging parameter, and controlling the process of charging the battery so as to cause the sequence of subsequent values of said at least one parameter to approximate the selected reference parameter sequence;

wherein;

the monitoring step comprises measuring the current values of said at least one charging parameter at short time intervals during charging, the comparing step comprises comparing the measured parameter values with corresponding reference values of the reference parameter sequences, the selecting the reference sequence step comprising selecting the relevant reference parameter sequence on the basis of comparison of such measured values and reference values, and the controlling step comprising determining a remaining period of charging time based on said comparison, and terminating the charging process when said remaining period of time has expired.

27. A method according 26, wherein the rate of change of the parameter values as a function of the charging time lapsed is compared to similar reference values.

28. A method according to claim 26, wherein the charging current is cut off for a short period of time immediately prior to each measurement of the potential difference of the battey terminals.

29. A method according to claim 28, wherein the parameter values are measured and the rates of change of the parameter values are determined at uniform first time intervals, each determination of the rates of change being based on parameter values measured at second time intervals, the second time interval being a multiple of the first time interval.

30. A method according to claim 29, wherein the charging current fed to the battery is controlled by pulse width modulating a constant voltage source.

31. A method according to claim 30, wherein the determination of said rate of change is initiated when a measured value of the characteristic parameters exceeds a predetermined value.

32. A method of charging a rechargeable battery having a pair of terminals, said method comprising connecting an electrical power source to the terminals of the battery, monitoring at least one charging parameter during at least part of the process of charging of the battery, comparing a sequence of values of said at least one charging parameter with stored reference parameter sequences representing idealistic or desirable processes of charging the battery for different starting states of charge of the battery, selecting the reference sequence corresponding to the sequence of values of said at least one charging parameter, and controlling the process of charging the battery so as to cause the sequence of subsequent values of said at least one parameter to approximate the selected reference parameter sequence;

wherein each of said parameter values is an average of a plurality of measurements within a certain period of time.

33. A method according to claim 26, wherein the charging period is restricted to a predetermined maximum period.

34. A method of charging a rechargeable battery having a pair of terminals, said method comprising connecting an electrical power source to the terminals of the battery, monitoring at least one charging parameter during at least part of the process of charging of the battery, comparing a sequence of values of said at least one charging parameter with stored reference parameter sequences representing idealistic or desirable processes of charging the battery for different starting states of charge of the battery.

selecting the reference sequence corresponding to the sequence of values of said at least one charging parameter, and controlling the process of charging the battery so as to cause the sequence of subsequent values of said at least one parameter to approximate the selected reference parameter sequence;

wherein the charging process is terminated if one of the monitored parameter values exceeds a predetermined value for the respective parameter.

35. A method according to claim 34, wherein the state of the charge of the battery is maintained after said termination of the charging process by feeding a pulsating current to the terminals of the battery.

36. An apparatus for charging a rechargeable battery, said apparatus comprising:

connecting means for connecting the battery to an electrical power source, means for monitoring at least one charging parameter during at least part of the process charging the battery, storing means for storing a plurality of reference parameter sequences representing idealistic or desirable processes of charging the battery for various starting states of charge of the battery, means for comparing the sequence of values of said at least one charging parameter with the stored reference parameter sequences and for selecting the reference course corresponding to the sequence of values of said at least one charging parameter, and means for controlling the process of charging the battery so as to cause the sequence of subsequent values of said at least one parameter to approximate the selected reference parameter sequence;

wherein the control means are adapted to control the process of charging the battery by controlling the voltage supplied to the connecting means so that the charging current is kept relatively low at the beginning of the charging process, to limit the voltage supplied to the connecting means to a predetermined maximum, and to terminate the charging process when a predetermined period of time related to the reference sequence finally selected by the comparing and selecting means and starting when said voltage maximum has been reached.

37. An apparatus according to claim 36, wherein the monitoring means comprise means for measuring current values of said at least one charging parameter at short time intervals during charging, the comparing means being adapted to compare the parameter values measured with corresponding reference values of the reference parameter sequences and to select the relevant reference parameter sequence based on such comparison.

38. An apparatus according to claim 37, wherein the comparing means are adapted to compare the rate of change of the parameter values as a function of the charging time lapsed with similar reference values.

39. An apparatus according to claim 37, wherein the control means are adapted to cut off the charging current supplied to the battery for a short period of time immediately prior to each measurement of the potential difference of the battery terminals.

40. An apparatus according to claim 39, wherein the measuring means are adapted to measure the parameter values at uniform first time intervals, the monitoring means being adapted to determine the rate of change based on parameter values measured at second time intervals each being a multiple of the first time interval.

41. An apparatus according to claim 40, wherein the control means are adapted to control charging current to the battery by pulse width modulating a constant voltage source.

42. An apparatus according to claim 41, wherein the monitoring means are adapted to initiate the determination of the rate of change when a value of the characteristic parameter measured exceeds a predetermined value.

43. An apparatus according to claim 42, wherein each of said parameter values compared is an average of a plurality of measurements within a certain period of time.

44. An apparatus according to claim 43, wherein the control means are adapted to restrict the charging period to a predetermined maximum period.

45. An apparatus according to claim 44, wherein the control means are adapted to terminate the charging process if one of the parameter values measured exceeds a predetermined value for the respective parameter.

46. An apparatus according to claim 45, wherein the control means are adapted to feed a pulsating current to the connecting means so as to maintain the state of the charge of the battery after said termination of the charging process.

47. An apparatus according to claim 46 wherein the control means comprises a microprocessor.

48. A method of charging a rechargeable battery having terminals, comprising:

selectively applying a voltage to the battery terminals to provide a charging current, measuring the voltage across the terminals of the battery during charging, cutting-off the charging current to the battery for a brief period before the voltage of the battery is measured, controlling the voltage supplied to the battery so that the charging current is kept relatively low at the beginning of the charging process.

determining the value of one or more characteristic parameters of the charging process at a plurality of points of time during charging, selecting a point of time.

determining a remaining charging period necessary to charge the battery from the selected point of time based upon the determined parameter values at that time and stored reference values corresponding to the determined values;

terminating the charging process when the remaining charging period of time has lapsed.

49. A method of charging a rechargeable battery having terminals, comprising:

selectively applying a voltage to the battery terminals to provide a charging current, applying a constant charging current to the battery during a first portion of the charging period, and then gradually reducing the charging current until charging is terminated, determining the value of one or more characteristic parameters of the charging process at a plurality of points of time during charging, selecting a point of time, determining the remaining charging period necessary to charge the battery from the selected point of time based upon the determined parameter values at that time and stored reference values corresponding to the determined values;

terminating the charging process when the remaining charging period of time has lapsed.

50. A method of charging a rechargeable battery having terminals, comprising:

selectively applying a voltage to the battery terminals to provide a charging current, controlling the charging current fed to the battery by pulse width modulating a constant voltage source, determining the value of one or more characteristic parameters of the charging process at a plurality of points of time during charging, selecting a point of time, determining the remaining charging period necessary to charge the battery from the selected point of time based upon the determined parameter values at that time and stored reference values corresponding to the determined values;

terminating the charging process when the remaining charging period of time has lapsed.

51. An apparatus for charging a rechargeable battery, said apparatus comprising an electrical source of energy for selectively providing a voltage to the battery, a measuring device for measuring one or more characteristic parameters of the charging process at at least one point of time during charging, a control unit, receptive of indicia of the measured parameters, for calculating other characteristic parameters, controlling the energy source and for terminating the charging process, the control unit including a storage circuit for storing measured parameter values, calculated parameter values and reference values, and being adapted to control the charging process based on the values stored, characterized in that the control unit is adapted to: control the voltage supplied to the battery so that the charging current is kept relatively low at the beginning of the charging process; determine an apparent remaining charging period of time necessary to fully charge the battery from the point of time based on the measured characteristic parameter or parameters at that time and stored reference values corresponding to the determined values; and to terminate the charging process at a stop point determined, in accordance with predetermined criteria, from the apparent remaining time periods.

52. An apparatus for charging a rechargeable battery said apparatus comprising a constant voltage source;

a measuring device for measuring one or more characteristic parameters of the charging process at at least one point of time during charging, a control unit, receptive of indicia of the measured parameters, for calculating other characteristic parameters, controlling the energy source and for terminating the charging process, the control unit including a storage circuit for storing measured parameter values, calculated parameter values and reference values and being adapted to control the charging process based on the values stored, the control unit being adapted to: control the charging current to the battery by pulse width modulating a constant voltage; determine an apparent remaining charging period of time necessary to fully charge the battery from the point of time based on the measured characteristic parameter or parameters at that time and stored reference values corresponding to the determined values; and to terminate the charging process at a stop point determined, in accordance with predetermined criteria, from the apparent remaining time periods.

* * * * *

UNITED STATES PATENT AND TRADEMARK OFFICE
CERTIFICATE OF CORRECTION

PATENT NO. : 5,619,118
DATED : April 8, 1997
INVENTOR(S) : Reipur et al.

It is certified that error appears in the above-identified patent and that said Letters Patent is hereby corrected as shown below:

Column 13, line 3, delete second occurrence of "time".
Column 14, line 17, delete "with the reference values".

Signed and Sealed this

Fourteenth Day of April, 1998

Attest:

BRUCE LEHMAN

*Attesting Officer*     *Commissioner of Patents and Trademarks*

Disclaimer

5,619,118—John Reipur, Klampenborg; Ebbe Juul-Hansen, Stenlose, both of Denmark. METHOD AND AN APPARATUS FOR CHARGING A RECHARGEABLE BATTERY. Patent dated April 8, 1997. Disclaimer filed November 2, 2000, by the assignee, Chartec Laboratories A/S.

Hereby enters this disclaimer to all claims of said patent.
*(Official Gazette, January 16, 2001)*